United States Patent [19]

Dean

[11] Patent Number: 4,701,493

[45] Date of Patent: Oct. 20, 1987

[54] ACRYLIC MODIFIED N-ARYLMALEIMIDE COPOLYMER MOLDING COMPOSITION

[75] Inventor: Barry D. Dean, Broomall, Pa.

[73] Assignee: Atlantic Richfield Company, Los Angeles, Calif.

[21] Appl. No.: 885,494

[22] Filed: Jul. 14, 1986

[51] Int. Cl.⁴ .................... C08L 39/04; C08L 51/04; C08L 55/02; C08K 3/40

[52] U.S. Cl. ................................ 524/504; 524/494; 524/511; 524/513; 524/514; 524/516; 524/523; 525/57; 525/64; 525/66; 525/67; 525/68; 525/70; 525/71; 525/73; 525/74; 525/205; 525/282

[58] Field of Search ................ 525/71, 73, 74, 72, 525/282, 57, 67, 68, 64, 70, 205, 66; 524/504, 516, 494, 511, 514, 513, 523

[56] References Cited

U.S. PATENT DOCUMENTS

| | | | |
|---|---|---|---|
| 3,998,907 | 12/1976 | DiGiulio | 525/57 |
| 4,224,216 | 9/1980 | Locatelli et al. | 524/528 |
| 4,381,373 | 4/1983 | Ikuma | 525/282 |
| 4,485,215 | 11/1984 | Dean | 525/282 |
| 4,567,233 | 1/1986 | Tomono et al. | 525/71 |
| 4,585,824 | 4/1986 | Uchida et al. | 524/521 |
| 4,598,126 | 7/1986 | Ikuma et al. | 525/282 |
| 4,608,414 | 8/1986 | Kitsunai et al. | 525/72 |
| 4,663,390 | 5/1987 | Dean | 525/71 |

*Primary Examiner*—Herbert J. Lilling
*Attorney, Agent, or Firm*—Dennis M. Kozak

[57] ABSTRACT

An acrylic modified styrenic/N-arylmaleimide copolymer containing composition which exhibits excellent melt flow properties, impact strength and gloss upon molding is disclosed.

22 Claims, No Drawings

ACRYLIC MODIFIED N-ARYLMALEIMIDE COPOLYMER MOLDING COMPOSITION

This invention relates to moldable compositions.

More specifically, this invention relates to moldable compositions containing acrylic modified styrenic/N-arylmaleimide copolymers.

In one of its more specific aspects, this invention pertains to acrylic modified styrenic/N-arylmaleimide copolymer containing compositions which exhibit excellent melt flow properties, impact strength and gloss upon molding. The moldable acrylic modified styrenic/N-arylmaleimide copolymer compositions are prepared by an emulsion polymerization process involving three sequential process steps.

The use of non-crosslinked acrylic modifiers for styrene/acrylonitrile copolymers is taught in U.S. Pat. Nos. 3,041,307; 3,041,308, and 3,041,309. In U.S. Pat. No. 3,517,084, an acrylic modifier is grafted with styrene/acrylonitrile resin by first forming the acrylic elastomer containing an acrylic monomer having a pendant vinyl group and then polymerizing the styrene/acrylonitrile monomer mixture in the presence of a free radical initiator. U.S. Pat. No. 3,944,631 teaches an acrylate-styrene-acrylonitrile composition which is formed from an acrylic elastomer which is crosslinked, a styrene/acrylonitrile copolymer which is crosslinked, and a styrene/acrylonitrile copolymer which is not crosslinked. And, U.S. Pat. No. 4,473,679 teaches thermoplastic acrylic-modified styrene/acrylonitrile copolymers based on core-shell technology.

The present invention differs from the teachings in the prior art in that it employs an N-arylmaleimide copolymer and the acrylic modified styrenic/N-arylmaleimide copolymer of the invention is prepared by an emulsion polymerization process which requires three sequential process steps. Specifically, the invention involves the formation of a styrenic/N-arylmaleimide/1,3-diene terpolymer and the formation of a styrenic/N-arylmaleimide copolymer. Both N-arylmaleimide containing polymers are polymerized in the presence of a crosslinked polyacrylate.

According to this invention, there is provided an acrylic modified styrenic/N-arylmaleimide copolymer moldable composition formed by a process which comprises the following three sequential steps. First, at least one alkyl acrylate is polymerized in the presence of a polyfunctional acrylate crosslinking monomer. Second, a styrenic/N-arylmaleimide/1,3-diene terpolymer is prepared in the presence of the crosslinked polyalkylacrylate prepared in the first step. Third, a styrenic/N-arylmaleimide copolymer is prepared in the presence of both the crosslinked polyalkylacrylate and the styrenic/N-arylmaleimide/1,3-diene terpolymer prepared in the first and second steps respectively.

Also, according to this invention, there is provided a method of producing a molded composition comprising forming an acrylic modified styrenic/N-arylmaleimide copolymer moldable composition using the sequential three step process described above and molding the resulting acrylic modified styrene/N-arylmaleimide copolymer composition.

In a preferred embodiment of this invention, the recurring styrenic monomer units of the styrenic/N-arylmaleimide/1,3-diene terpolymer prepared in step two and the recurring styrenic monomer units of the styrenic/N-arylmaleimide copolymer prepared in step three are selected to be the same styrenic monomer.

In another preferred embodiment, the recurring N-arylmaleimide units of the styrenic/N-arylmaleimide/1,3-diene terpolymer and the recurring N-arylmaleimide units of the styrenic/N-arylmaleimide copolymer are selected to be the same N-arylmaleimide monomers.

The invention is more specifically described as follows. The process comprises three sequential steps involving emulsion polymerization. In the first step, at least one alkyl acrylate monomer is polymerized in the presence of from about 0.005 to about 0.01 total weight percent of at least one polyfunctional acrylate crosslinking monomer. In the second step, a solution of a styrenic monomer, an N-arylmaleimide monomer, and a 1,3 diene-monomer solution is polymerized in the presence of the crosslinked polyacrylate formed in the first step. No polyfunctional acrylate crosslinking monomer is employed in the second step. In the third step, a solution of a styrenic monomer and an N-arylmaleimide monomer is polymerized in the presence of the crosslinked polyacrylate formed in the first step and the styrenic/N-arylmaleimide/1,3-diene terpolymer formed in the second step.

The composition of the polymers formed in each of the individual steps is as follows. The crosslinked polyacrylate formed in the first step will contain at least 99% by weight recurring units of at least one alkyl acrylate and from about 0.005 to about 0.01% by weight recurring units of a polyfunctional acrylate crosslinking monomer.

Any suitable alkyl acrylate monomer can be used. Suitable alkyl acrylate monomers include methyl acrylate, ethyl acrylate, n-butyl acrylate, and the other $C_3$ to $C_{10}$ alkyl acrylates and their mixtures. Most preferred is n-butyl acrylate.

Any suitable polyfunctional acrylate can be used. Suitable ones include 1,3-butylene di(meth)acrylate, ethylene glycol di(meth)acrylate, diethylene glycol di(meth)acrylate and other di(meth)acrylates and their mixtures. Most preferred is diethylene glycol di(meth)acrylate.

The number average molecular weight (Mn) of the polyacrylate formed in the first step, as determined by gel permeation chromatography versus a monodisperse polystyrene standard, should be within the range of from about 200,000 to about 500,000.

The styrenic/N-arylmaleimide/1,3-diene terpolymer formed in the second step will contain from about 20 to about 50 weight percent recurring units of a styrenic monomer, about 15 to about 25 weight precent recurring units of N-arylmaleimide monomer and about 35 to about 55 weight percent recurring units of a 1,3-diene monomer.

Suitable styrenic monomers include styrene, p-methyl styrene, t-butylstyrene, dibromostyrene, paravinylbenzoic acid and the like, and their mixtures.

Suitable N-arylmaleimide monomers include N-phenyl-maleimide; 2, 3, or 4-methylphenylmaleimide; 2, 3, or 4 bromophenylmaleimide, and 2, 3, or 4 methoxyphenylmaleimide.

The 1,3-diene monomer can be 1,3-butadiene, isoprene, of their mixture; 1,3-butadiene is preferred.

The number average molecular weight (Mn) of the styrenic/N-arylmaleimide/1,3-diene terpolymer as determined by gel permeation chromatography should be within the range of from about 180,000 to about 600,000.

The styrenic/N-arylmaleimide copolymer formed in step three will contain from about 70 to about 85 weight percent recurring units of styrenic monomer and from about 15 to about 30 weight percent recurring units of N-arylmaleimide. Suitable styrenic monomers and N-arylmaleimide monomers are as described above. The number average molecular weight (Mn) of the copolymer will be within the range of from about 140,000 to about 260,000.

The overall composition of the acrylic modified N-arylmaleimide copolymer molding composition will comprise from about 10 to about 20 weight percent of the crosslinked polyacrylate (step one), from about 5 to about 15 weight percent of the styrenic/N-arylmaleimide/1,3-diene terpolymer (step two) and from about 65 to about 85 weight percent of the styrenic/N-arylmaleimide copolymer (step three).

The moldable compositions of this invention also form stable mechanical blends with other thermoplastic resins and can be blended to provide moldable compositions comprising from about 1 to about 99 weight percent of the composition of this invention and from about 99 to about 1 weight percent of a thermoplastic resin selected from the group consisting of: poly(vinyl chloride); chlorinated poly(vinyl chloride), styrene/acrylonitrile (ABS), styrene/maleic anhydride, rubber modified styrene/maleic anhydride, poly(methylmethacrylate); polycarbonate, polyesters, e.g., poly(ethylene terephthalate), poly(butylene terephthalate), polyacrylates; polyamides, e.g., nylon 6, nylon 6.6, nylon 6.10, nylon 6.12, nylon 8, nylon 11, nylon 12; polysulfones, poly(phthalate-carbonates), poly(phenylene oxide), acetals and polyether imides and the like, and their mixtures.

The moldable compositions of this invention can also include other ingredients such as extenders, processing aids, pigments, mold release agents and the like, for their conventionally employed purpose. Additives used to achieve special effects may also be incorporated. For example, reinforcing fillers in amounts sufficient to impart reinforcement can be incorporated, such as titanium dioxide, potassium titanate and titanate whiskers, glass flakes, chopped glass fibers, and the like.

The following examples serve to demonstrate the invention. Evaluation of material properties was performed based on the following ASIM standard tests: tensile strength (D-638), tensile impact (D-1822), strength (D-638), notched Izod (D-256), and DTUL (deflection temperature under load, $\frac{1}{8}''$ at 264 psi (D-648). Gardner falling weight index (GFWI) was established using a $1\frac{1}{4}''$ diameter orifice and an 8 pound $\frac{1}{2}''$ diameter weight. Glass transition temperature was determined by differential scanning colorimetry (DCS) and dynamic mechanical analysis (DMA).

EXAMPLE 1

This example demonstrates the preparation of an acrylic modified styrenic/N-arylmaleimide copolymer molding composition of this invention using an emulsion polymerization process and three sequential steps.

In the first stage, a pressure reactor was charged with 325 milliliters of water, 2.7 grams of sodium dodecylbenzene sulfonate and 20 milliliters of a 1% sodium bicarbonate solution. The aqueous system was degassed with nitrogen for 20 minutes. The reactor was then charged with 180 grams of n-butyl acrylate, 0.16 gram of tetraethyleneglycol diacrylate and 20 milliliters of a 2% potassium persulfate solution. The reactor was heated to 65° C. for 5.5 hours resulting in 95% conversion of monomer to polymer.

The second stage of the reaction was run by charging the reactor with 81 grams of styrene, 27 grams of N-phenyl-maleimide, 99 grams of 1,3-butadiene and 10 milliliters of a 2% potassium persulfate solution, and then maintaining the reaction temperature at 75° C. for five hours. This process resulted in 95% of the total monomers charged being converted to polymer.

The final (third) stage was conducted by charging an additional 700 grams of water, 5 grams of sodium dodecylbenzene sulfonate and 60 milliliters of 2% potassium persulfate. The reactor temperature was held at 75° C. while a solution of 685 grams of styrene and 155 grams of N-phenylmaleimide was added dropwise over 4 hours. Once the comonomer solution had been added, the reaction was maintained at 75° C. for an additional hour. The reaction mass was recovered by coagulating using 10% calcium chloride solution to give a pale yellow powder.

The overall conversion for the three steps was 91%. The polymer analyzed for 1.31 weight percent nitrogen which corresponds to 19 weight percent N-phenylmaleimide comonomer content. The number average molecular weight (Mn) of the styrene/N-phenylmaleimide copolymer of step three by gel permeation chromatography was 175,400.

The polymer powder was stabilized with 0.2 weight percent Ethanox ® 330 antioxidant commercially available from Ethyl Corporation. The polymer powder was then extruded into pellets and test specimens were molded. The properties of the polymer from Example 1 versus a control are shown below. The control sample was prepared as in Example 1 except the second stage was eliminated, i.e., there was no styrene/N-phenylmaleimide/1,3-diene terpolymer component in the control sample.

TABLE 1

| | Moldable Composition | |
|---|---|---|
| | Control | Example 1 |
| Tg(°C., DSC) | 133 | 134 |
| Tg(°C., DMA) | −22,145 | −35,147 |
| DTUL(°F., $\frac{1}{8}''$) | 214 | 216 |
| Tensile Strength (psi) | 6650 | 7120 |
| Notched Izod | | |
| (ft-lbs/in) | 3.1 | 5.8 |
| (GFWI(in-lbs) | 112 | 240 |
| Tensile Impact (ft-lb/in) | 90 | 280 |
| Gloss (% reflected light) | 67 | 89 |
| Apparent Viscosity (245° C.) | | |
| 1500 sec$^{-1}$ | 2650 | 1860 |
| 2900 sec$^{-1}$ | 1740 | 1050 |

EXAMPLE 2

This example demonstrates the preparation of another acrylic modified styrenic/N-arylmaleimide copolymer molding composition of this invention.

First, a pressure reactor was charged with 325 milliliters of water, 2.7 grams of sodium dodecylbenzene sulfonate and 20 milliliters of a 1% sodium bicarbonate solution. The aqueous system was degassed with nitrogen for 20 minutes. The reactor was then charged with 180 grams of n-butyl acrylate, 0.16 gram of tetraethyleneglycol diacrylate and 20 milliliters of a 2% potassium persulfate solution. The reactor was heated to 65° C. for 5.5 hours resulting in 97% conversion of monomer to polymer.

The second stage of the reaction was run by charging the reactor at 65° C. with 75 grams of styrene, 36 grams of N-phenylmaleimide, 85 grams of 1,3-butadiene and 10 milliliters of a 2% potassium persulfate solution. The reactor temperature was raised to 75° C. for five hours, resulting in 94% conversion of monomer to polymer.

The final (third) stage was conducted by charging an additional 700 grams of water, 5 grams of sodium dodecylbenzene sulfonate and 60 milliliters of 2% potassium persulfate. The reactor temperature was held at 75° C. while a solution of 481 grams of styrene and 143 grams of N-phenylmaleimide was added dropwise over four hours. Once the comonomer solution had been added, the reaction was maintained at 75° C. for an additional hour. The reaction mass was coagulated with 10% calcium chloride solution to yield a pale yellow powder. The overall conversion over all three steps was 92%.

The polymer analyzed for 2.05 weight percent nitrogen which corresponds to 29.8 weight percent N-phenylmaleimide in the acrylic modified styrene/N-phenylmaleimide copolymer. The number average molecular weight (Mn) of the acrylic modified styrene/N-phenylmaleimide copolymer by GPC was 185,000.

The polymer powder was stabilized with 0.4 weight percent Ethanox ® 330 antioxidant. The polymer powder was extruded into pellets and test specimens were molded. The properties of the polymer from Example 2 versus a control are shown below. The control sample was prepared as in Example 2 except the second stage was eliminated, i.e., there was no styrene/N-phenylmaleimide/1,3-diene terpolymer component in the control sample.

TABLE 2

|  | Moldable Composition | |
| --- | --- | --- |
|  | Control | Example 2 |
| Tg(°C., DSC) | 149 | 152 |
| Tg(°C., DMA) | −25,159 | −37,163 |
| DTUL(°F., ⅛") | 247 | 251 |
| Tensile Strength (psi) | 6850 | 7360 |
| Notched Izod | | |
| (ft-lbs/in) | 2.7 | 5.6 |
| (GFWI(in-lbs) | 126 | 268 |
| Tensile Impact (ft-lb/in) | 96 | 277 |
| Gloss (% reflected light) | 71 | 87 |
| Apparent Viscosity (245° C.) | | |
| 1500 sec$^{-1}$ | 3280 | 2180 |
| 2900 sec$^{-1}$ | 2860 | 1650 |

EXAMPLE 3

This example serves to demonstrate the preparation of a polymer blend containing an acrylic modified styrenic/N-arylmalemide of this invention (Example 2) and poly(vinyl chloride) resin.

About 60 weight % of a poly(vinyl chloride) resin (PVC) and about 40 weight % of the acrylic modified styrene/N-phenylmaleimide copolymer (acrylic-S/N-PMI) prepared in Example 2 were physically mixed, pelletized, and molded into test specimens. The properties of the blend are shown below relative to those of the PVC in the absence of the acrylic-S/N-PMI copolymer of this invention.

|  | PVC | PVC/acrylic-S/N—PMI (60/40) |
| --- | --- | --- |
| DTUL (°F., ⅛") | 157 | 202 |
| Tensile Str (psi) | 7950 | 7450 |
| Notched Izod (ft-lbs/in) | 0.9 | 18.7 |
| GFWI (in-lbs) | 240 | 580 |

It will be evident from the foregoing that various modifications can be made to this invention. Such, however, are considered as being within the scope of the invention.

What is claimed is:

1. An acrylic modified styrenic/N-arylmaleimide copolymer moldable composition formed by a process which comprises the following three sequential steps:
   (A) polymerizing at least one alkylacrylate monomer in the presence of at least one polyfunctional acrylate crosslinking monomer;
   (B) forming a styrenic/N-arylmaleimide/1,3-diene terpolymer in the presence of the polyacrylate prepared in (A); and
   (C) forming a styrenic/N-arylmaleimide copolymer in the presence of both the crosslinked polyacrylate prepared in (A) and the styrenic/N-arylmaleimide/1,3-diene terpolymer prepared in (B).

2. The moldable composition of claim 1 in which in step (A), said at least one alkyl acrylate monomer is selected from the group consisting of methyl acrylate, ethyl acrylate, n-butyl acrylate, and the other $C_3$–$C_{10}$ alkyl acrylates.

3. The moldable composition of claim 1 in which in step (A), said at least one polyfunctional acrylate is selected from the group consisting of 1,3-butylene di(meth)acrylate, ethylene glycol di(meth)acrylate, diethylene glycol di(meth)acrylate, and other di(meth) acrylates.

4. The moldable composition of claim 1 in which in step (A), at least 99 total weight percent of at least one alkyl acrylate monomer is polymerized in the presence of from about 0.005 to about 0.01 total weight percent recurring units of said at least one polyfunctional acrylate crosslinking monomer.

5. The moldable composition of claim 1 in which the resulting crosslinked polyacrylate of step (A) has a number average molecular weight within the range of from about 200,000 to about 500.000.

6. The moldable composition of claim 1 in which in step (B), said terpolymer contains from about 20 to about 50 weight percent recurring units of a styrenic monomer, from about 15 to about 25 weight percent recurring units of N-arylmaleimide, and from about 35 to about 55 weight percent recurring units of a 1,3-diene monomer.

7. The moldable composition of claim 1 in which in steps (B) and (C), said styrenic monomers are separately selected from the group consisting of styrene, p-methylstyrene, t-butylstyrene, dibromostyrene, and para-vinylbenzoic acid.

8. The moldable composition of claim 1 in which in steps (B) and (C), said N-arylmaleimide monomers are separately selected from the group consisting of N-phenylmaleimide; 2, 3, or 4-methylphenylmaleimide; 2, 3, or 4-bromophenylmaleimide; and 2, 3, or 4 methoxyphenylmaleimide.

9. The moldable composition of claim 1 in which in step (B), said 1,3-diene monomer is selected from the group consisting of 1,3-butadiene and isoprene.

10. The moldable composition of claim 1 in which the resulting terpolymer of step (B) has a number average molecular weight within the range of from about 180,000 to about 600,000.

11. The moldable composition of claim 1 in which in step (C), said copolymer contains from about 70 to about 85 weight percent recurring units of a styrenic monomer and from about 15 to about 30 weight percent recurring units of N-arylmaleimide.

12. The moldable composition of claim 1 in which the styrenic monomer employed in the terpolymer formed in step (B) and the styrenic monomer employed in the copolymer formed in step (C) are the same styrenic monomers.

13. The moldable composition of claim 1 in which the N-arylmaleimide monomer employed in the terpolymer formed in Step (B) and N-arylmaleimide monomer employed in the copolymer formed in step (C) are the same N-arylmaleimide monomers.

14. The moldable composition of claim 1 in which the resulting copolymer of step (C) has a number average molecular weight within the range of from about 140,000 to about 260,000.

15. The moldable composition of claim 1 comprising in weight percent from about 10 to about 20 of the crosslinked polyacrylate; from about 5 to about 15 of a styrenic/N arylmaleimide/1,3-diene terpolymer; and from about 65 to about 85 of the styrenic/N-arylmaleimide copolymer.

16. A method for producing a molded composition which comprises (i) forming an acrylic modified styrenic/N-arylmaleimide moldable composition by a process which comprises the following three sequential steps:
(A) polymerizing at least one alkyl acrylate monomer in the presence of at least one polyfunctional acrylate crosslinking monomer;
(B) forming a styrenic/N-arylmaleimide/1,3-diene terpolymer in the presence of the crosslinked polyacrylate prepared in (A); and
(C) forming a styrenic/N-arylmaleimide copolymer in the presence of the crosslinked polyacrylate prepared in (A) and the styrenic/N-arylmaleimide/1,3-diene terpolymer prepared in (B), and (ii) molding the resulting moldable composition.

17. The method of claim 16 in which the moldable composition is molded in contact with a reinforcing filler.

18. The method of claim 17 in which said reinforcing filler is glass fibers.

19. A moldable polymer composition comprising in weight percent (i) from about 1 to about 99 of an acrylic modified styrenic/N-arylmaleimide moldable composition formed by a process which comprises the following three sequential steps:
(A) polymerizing at least one alkylacrylate monomer in the presence of at least one polyfunctional acrylate crosslinking monomer;
(B) forming a styrenic/N-arylmaleimide/1,3-diene terpolymer in the presence of the crosslinked polyacrylate prepared in (A); and
(C) forming a styrenic/N-arylmaleimide copolymer in the presence of the crosslinked polyacrylate prepared in (A) and the styrenic/N-arylmaleimide/1,3-diene terpolymer prepared in (B), and (ii) from about 99 to about 1 of at least one thermoplastic resin selected from the group consisting of poly(vinyl chloride); chlorinated poly(vinyl chloride), styrene/acrylonitrile, styrene/maleic anhydride, rubber modified styrene/maleic anhydride, poly(methylmethacrylate); polycarbonate, polyesters, polyacrylates; polyamides, polysulfones, poly(phthalate-carbonates), poly(phenylene oxide), acetals and polyether imides.

20. A method for producing a molded polymer composition which comprises (i) blending from about 1 to about 99 weight percent of an acrylic modified styrenic/N-arylmaleimide moldable composition formed by a process which comprises the following three sequential steps:
(A) polymerizing at least one alkyl acrylate monomer in the presence of at least one polyfunctional acrylate crosslinking monomer;
(B) forming a styrenic/N-arylmaleimide/1,3-diene terpolymer in the presence of the polyacrylate prepared in (A); and
(C) forming a styrenic/N-arylmaleimide copolymer in the presence of the polyacrylate prepared in (A) and the styrenic/N-arylmaleimide/1,3-diene terpolymer prepared in (B),
with from about 99 to about 1 total weight percent of at least one thermoplastic resin selected from the group consisting of poly(vinyl chloride); chlorinated poly(vinyl chloride), styrene/acrylonitrile, styrene/maleic anhydride, rubber modified styrene/maleic anhydride, poly(methylmethacrylate); polycarbonate, polyesters, polyacrylates; polyamides, polysulfones, poly(phthalatecarbonates), poly(phenylene oxide), acetals and polyether imides and (ii) molding the resulting blend.

21. The method of claim 20 in which the blend is molded in contact with a reinforcing filler.

22. The method of claim 21 in which said reinforcing filler is glass fibers.

* * * * *